US007168149B2

(12) United States Patent
Kalemba et al.

(10) Patent No.: US 7,168,149 B2
(45) Date of Patent: Jan. 30, 2007

(54) APPARATUS FOR CLOSING A HINGED MOLDED PART (75) Inventors: Jacek Kalemba, Oakville (CA); Adrian Looije, Aurora (CA); James Rodrigues, Caledon (CA)

(73) Assignee: Husky Injection Molding Systems Ltd., Bolton (CA)

( * ) Notice: Subject to any disclaimer, the term of this patent is extended or adjusted under 35 U.S.C. 154(b) by 150 days.

(21) Appl. No.: 10/243,002

(22) Filed: Sep. 13, 2002

(65) Prior Publication Data

US 2004/0052891 A1 Mar. 18, 2004

(51) Int. Cl.
*B21B 1/46* (2006.01)
(52) U.S. Cl. .................. 29/527.1; 29/453; 425/556
(58) Field of Classification Search ............. 29/453, 29/527.3, 527.1; 425/436 RM, 556, 444; 249/68
See application file for complete search history.

(56) References Cited

U.S. PATENT DOCUMENTS

| 4,040,595 | A | * | 8/1977 | Tecco ........................... 249/68 |
| 4,340,352 | A | | 7/1982 | Hayberg |
| 4,351,630 | A | | 9/1982 | Hayberg |
| 4,818,208 | A | * | 4/1989 | Byrne ......................... 425/394 |
| 4,976,603 | A | | 12/1990 | DiSimone |
| 5,037,597 | A | * | 8/1991 | McGinley et al. ........... 264/238 |
| 5,208,802 | A | * | 5/1993 | Suzuki et al. ................ 720/720 |
| 5,518,387 | A | | 5/1996 | DiSimone |
| 5,709,833 | A | | 1/1998 | Simone |
| 5,906,841 | A | * | 5/1999 | Bak ........................... 425/556 |
| 6,158,197 | A | * | 12/2000 | Mogard et al. ............... 53/410 |

OTHER PUBLICATIONS

Dictionary.com, definition of the term "fold", http://dictionary.reference.com/search?q=fold.*
Processor's Page; Plastics Technology; May 1997, p. 170.

* cited by examiner

*Primary Examiner*—Marc Jimenez (57) ABSTRACT

An apparatus and method for folding a hinged molded part in a molding machine. As a part-removal apparatus, preferably a swing arm mechanism, grips one of the lid portion or the base portion of the molded part and moves the molded part out of the mold, a deflector connected to a portion of the mold engages the other portion of the part and initiates folding of the lid portion to the base portion at the hinge. The deflector further folds the part as the mold closes. The portions of the part are pushed together and latched in one embodiment by the swing arm mechanism that grips and moves the molded part against the deflector, and in another embodiment by a closing actuator operated separately from the swing arm mechanism.

14 Claims, 10 Drawing Sheets

APPARATUS FOR CLOSING A HINGED MOLDED PART

BACKGROUND OF INVENTION

1. Field of the Invention

The present invention relates, generally, to apparatus for automatic handling of molded parts. More particularly, the invention relates to apparatus used on a molding machine for closing a lid on a molded part, having a base portion and a lid portion, immediately after the part is molded.

2. Background Information

The state of the art includes various devices and methods for removing molded parts from multicavity molds. When the molded part has a base portion and a hinged lid portion, sometimes it is desirable that the lid portion be closed onto the base portion before the part is processed further. Reasons for closing the hinged lid on a base immediately after molding include maintaining the sterility of the interior of a container comprising the base and the lid, folding the hinge while it is warm so it will be unstressed in a closed position, and simply to eliminate the need for that separate step later. A device that closes the lid portion of a molded part while the part is still in the mold is disclosed in U.S. Pat. Nos. 4,340,352 and 4,351,630. These patents show a separately-actuated closing mechanism that moves transverse to the mold while the mold is open. Such a mechanism is relatively complex and expensive and can add to the cycle time since it must move in, close the lid and move out of the way before the part is ejected and another molding cycle performed. Alternatively, robots are used to capture molded parts and move them out of the molding area where they are closed by a separate apparatus. Such a robot is disclosed in an article on page 170 of the May 1997 issue of *Plastics Technology*. Though this has minimal impact on cycle time, the robot and separate closing apparatus are separate machines in addition to the molding machine and again can be relatively complex and expensive.

A relatively simple and inexpensive mechanism for removing molded parts which does not significantly reduce molding cycle time is a mechanism that uses pivoting arms with suction devices at the end of each arm to unload molded parts as taught in U.S. Pat. Nos. 4,976,603, 5,518,387 and 5,709,833 hereby incorporated herein by reference. These patents are directed solely to part ejection and teach using a pivoting arm attached to one of the mold plates to enter an open mold space, capture an ejected molded part and transport it to a position adjacent the mold so that the part can be released.

There is a need for a simple, inexpensive mechanism to close a lid on a molded part without significantly adding to the cycle time.

SUMMARY OF INVENTION

The present invention provides an apparatus and method for folding a hinged molded part formed in a mold with portions that open and close in a molding machine. The part has a base portion and a lid portion that engages the base portion when the part is folded at a hinge located between the base portion and the lid portion.

In one embodiment, the apparatus comprises a part-removal apparatus proximate the mold and at least one deflector connected to a portion of the mold. The part removal apparatus has a portion that, in use, grips one of the base portion or the lid portion of the part and moves the part out of he mold when the mold is open. In use, the deflector engages the other of the base portion or the lid portion of the part as the part is moved to initiate folding of the lid portion to the base portion at the hinge. The deflector further folds the part as the mold closes.

The part-removal apparatus is preferably a swing arm mechanism that includes an arm with a gripping device attached to a rotatable shaft, located adjacent a portion of the mold, that selectively rotates to pivot the arm between a first position at which the swing arm mechanism is clear of the mold so the mold can open and close without interfering with the swing arm mechanism, and a second position at which the gripping device engages and grips the portion of the molded part.

In another embodiment, the apparatus further provides a closing actuator having a portion that selectively moves to engage the portion of the part gripped by the part-removal apparatus to push the base portion and the, lid portion together, thereby latching the lid portion and the base portion together.

The method comprising the steps of moving the molded part out of a mold that formed the part so that as the part moves, one of the lid portion or the base portion engages a deflector connected to he mold, thereby initiating folding of the lid portion to the base portion at the hinge; moving the deflector by closing the mold so that the deflector continues to engage the portion engaged by the deflector and further fold the part; and pushing the base portion and the lid portion together so that the lid portion and base portion latch.

In one embodiment, the pushing is done by a swing arm mechanism that grips and moves the part. In another embodiment, the pushing is done by a device operated separately from the swing arm mechanism.

The features and benefits of this invention will become clear to those skilled in the art by reference to the following exemplary description and illustrative drawings.

DETAILED DESCRIPTION

Injection molding machines and their operation with molds to produce molded plastic parts are well known. While the embodiments described are illustrated with respect to a single-cavity mold forming a single part, the invention can be applied to multicavity molds simply by providing a lid closing apparatus as described at each mold cavity.

Referring to FIGS. 1–5, which illustrate the operating sequence of a preferred embodiment of the present invention, an example of a preferred embodiment of the present invention is illustrated and generally indicated by the reference numeral 20. The lid-closing apparatus 20 preferably comprises a part-removal apparatus that preferably is a pivoting swing-arm mechanism 22, at least one deflector 24, and a closing actuator 26 all constructed and arranged to operate in conjunction with the opening and closing of a mold 28 that forms a molded part 30 having a base portion 32, or other such portion, that engages a lid portion 34 when the part 30 is folded at a hinge 36. While the embodiments are illustrated and described with the part-removal apparatus grabbing the base portion 32, and the deflector 24 folding the lid portion 34, the invention could just as easily be practiced with the part-removal apparatus grabbing the lid portion 34 and the deflector 24 folding the base portion 32. Since the base portion 32 is generally stiffer than the lid portion 34, it is preferable to grab the stiffer base portion 32 and to fold the lid portion 34.

Figure 3:
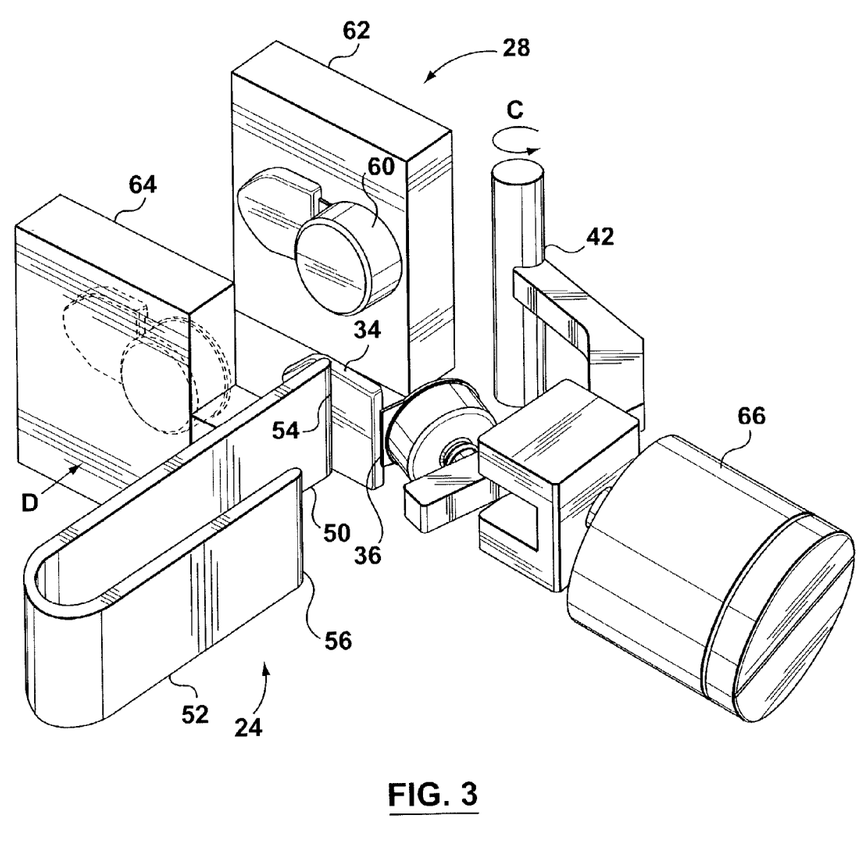
FIG. 3 is the view of FIG. 1 showing the swing arm pivoting the molded part off of a core, and a lid portion of the molded part engaging and being folded about a hinge by a first portion of a deflector, attached to the mold, as a mold begins to close.

The part removal apparatus is located proximate the mold 28 and is preferably a swing arm mechanism such as taught in U.S. Pat. Nos. 4,976,603, 5,518,387 or 5,709,833. Swing-arm mechanism 22 includes an arm 40 attached to a rotatable shaft 42 that is preferably located adjacent the mold and selectively rotates to pivot arm 40 either way between a first position, shown in FIG. 1, and a second position, shown in FIG. 2. Swing arm mechanism 22 is preferably cam-driven by the opening and closing of the mold 28, or servo-driven by at least one servo motor sequenced to the opening and closing of the mold. Such driving mechanisms are well known to those skilled in the art. At the first position the swing arm mechanism 22 is clear of the mold 28 so the mold can open and close without interfering with the swing arm mechanism. As the mold 28 opens, as indicated by arrow A, shaft 42 pivots as indicated by arrow B to move the swing-arm mechanism 22 to the second position at which a gripping device, such as suction cup 44, or similar device, on arm 40 engages and grips the base portion 32 of molded part 30. As the part 30 is ejected from the core 60 on core side 62 of mold 28, shaft 42 rotates in the direction indicated by arrow C and swing arm mechanism 22 pivots part 30 away from core 60 and out of mold 28 as illustrated in FIG. 3.

Deflector 24 preferably includes an first portion 50 and a second portion 52. First portion 50 is preferably attached to the side of cavity side 64 of mold 28 adjacent swing-arm mechanism 22. First portion 50 has a contact end 54 and is positioned relative to cavity side 64 and arm 40 such that when arm 40 pivots part 30 away from core 60, lid portion 34 hits contact end 54 and initiates folding of the lid portion 34 to the base portion 32 at the hinge 36 in advance of closure of the lid portion 34 to the base portion 32. Mold 28 then begins to close, as indicated by arrow D, moving cavity side 64 closer to core side 62 and in doing so contact end 54 of first portion 50 of deflector 24 continues to engage lid portion 34 and fold it further.

Figure 4:
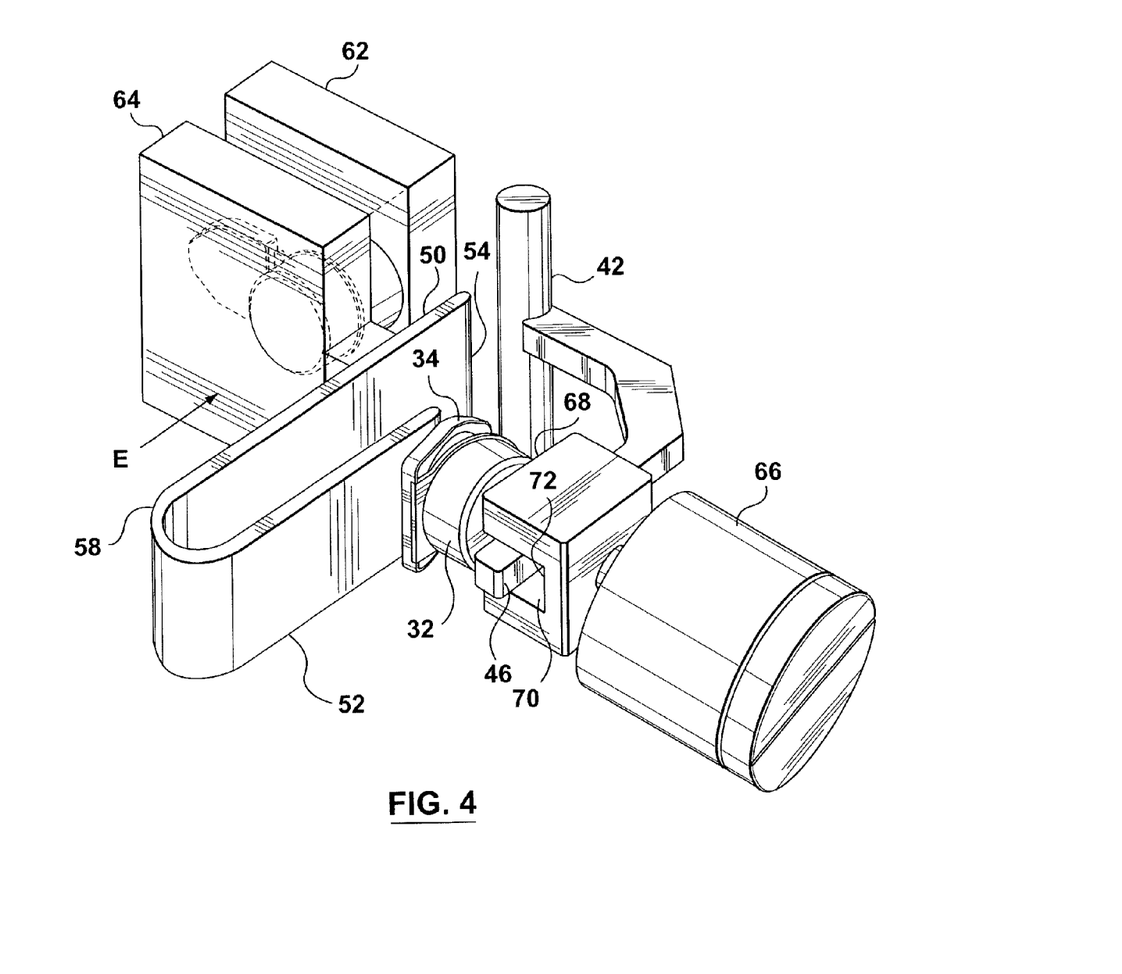
FIG. 4 is the view of FIG. 1 showing the mold further closing and the lid of the molded part being further folded by a second portion of the deflector.

Referring to FIG. 4, as cavity side 64 moves closer to core side 62, as indicated by arrow E, sliding end 56 of second portion 52 engages lid portion 34, pushing lid portion 34 off of first portion 50. Second portion 52 is located outboard of first portion 50 such that as cavity side 64 moves toward core side 62, second portion 52 slides along lid portion 34 keeping lid portion 34 in a nearly-closed position.

Figure 5:
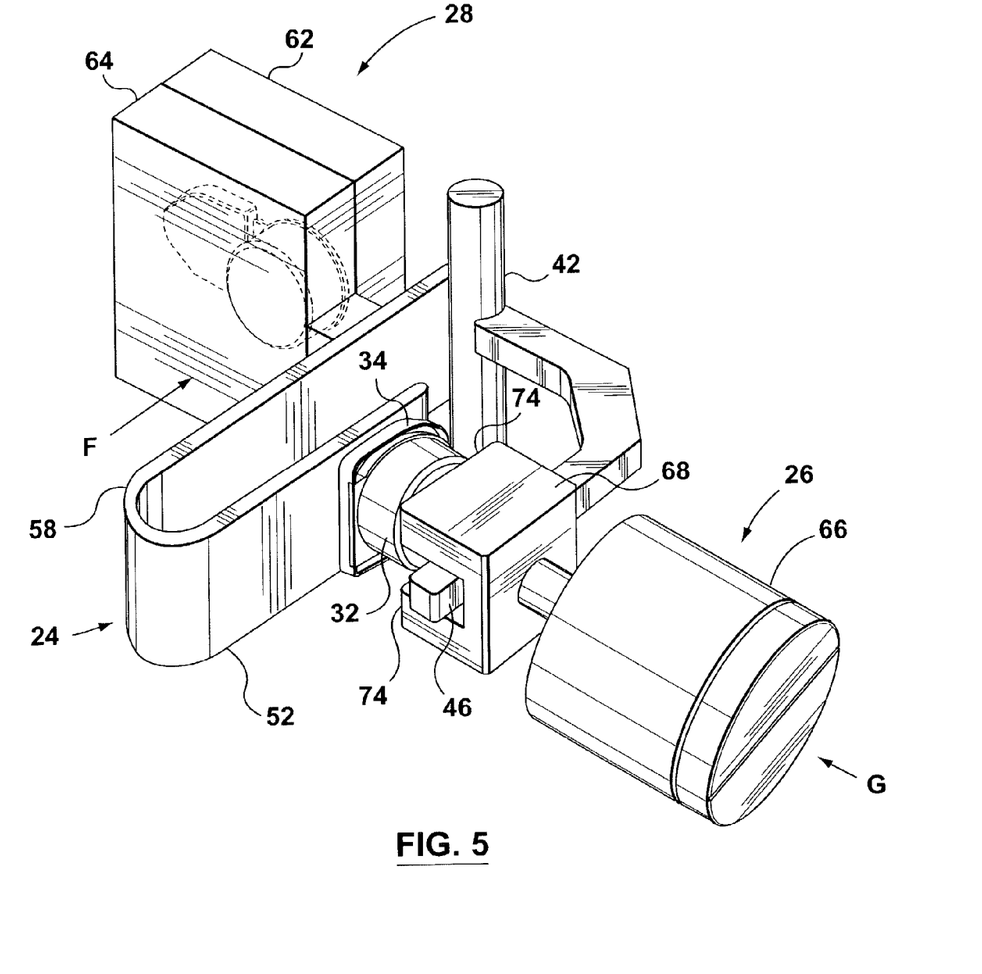
FIG. 5 is the view of FIG. 1 showing the lid of the molded part being closed by movement of a closing actuator.

Referring to FIG. 5, mold 28 continues to close, as indicated by arrow F, until cavity side 64 engages core side 62. The mold 28 is thereby closed and ready for another shot of molten plastic used in a new molding cycle. Closing actuator 26 is then actuated, in the direction shown by arrow G, to close lid portion 34 by advancing the part 30 to cause the part 30 to press against the second portion 52 of the deflector. Closing actuator 26 is preferably mounted to a mold base plate or the molding machine (not shown) and includes an actuation device 66, such as an air cylinder hydraulic cylinder, solenoid, or the like to which a pusher member 68 is attached.

Figure 1:
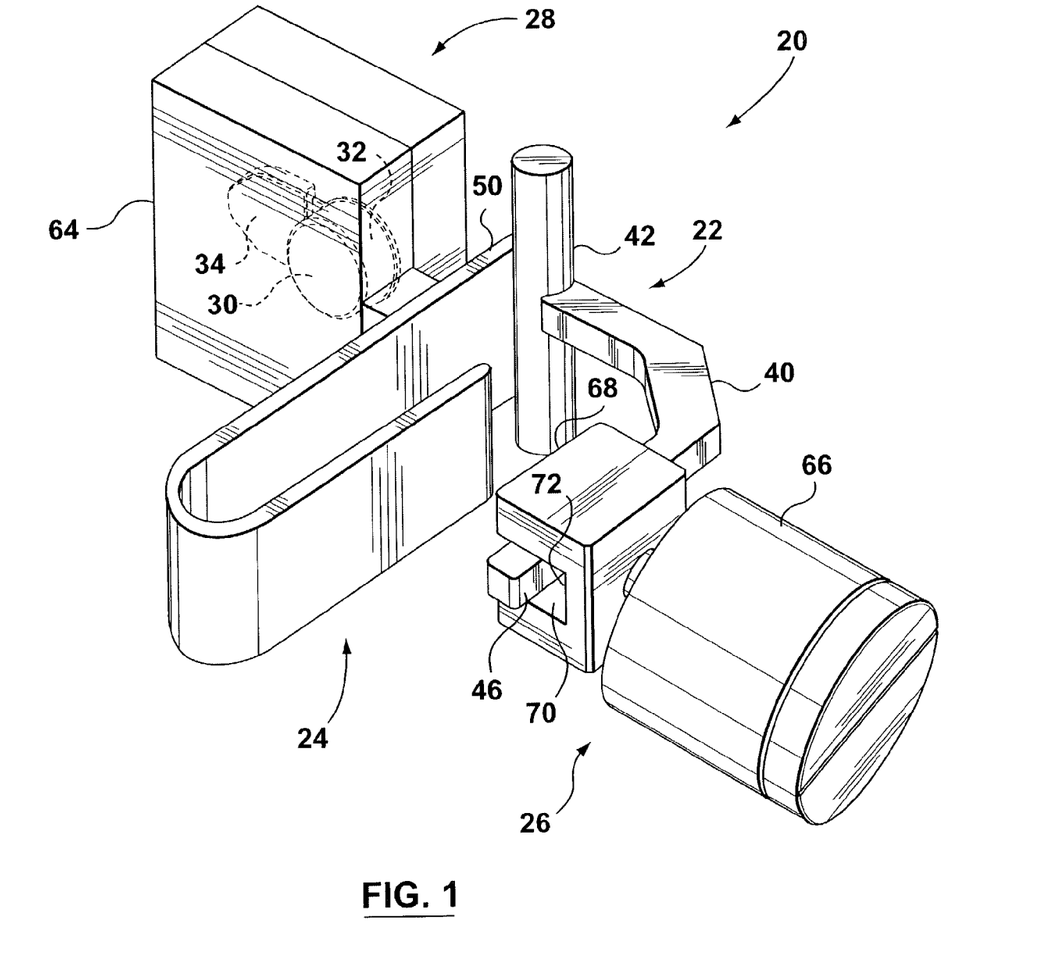
FIG. 1 is a perspective view of an embodiment of the present invention showing a closed mold with a molded part having a lid to be closed.
Figure 2:
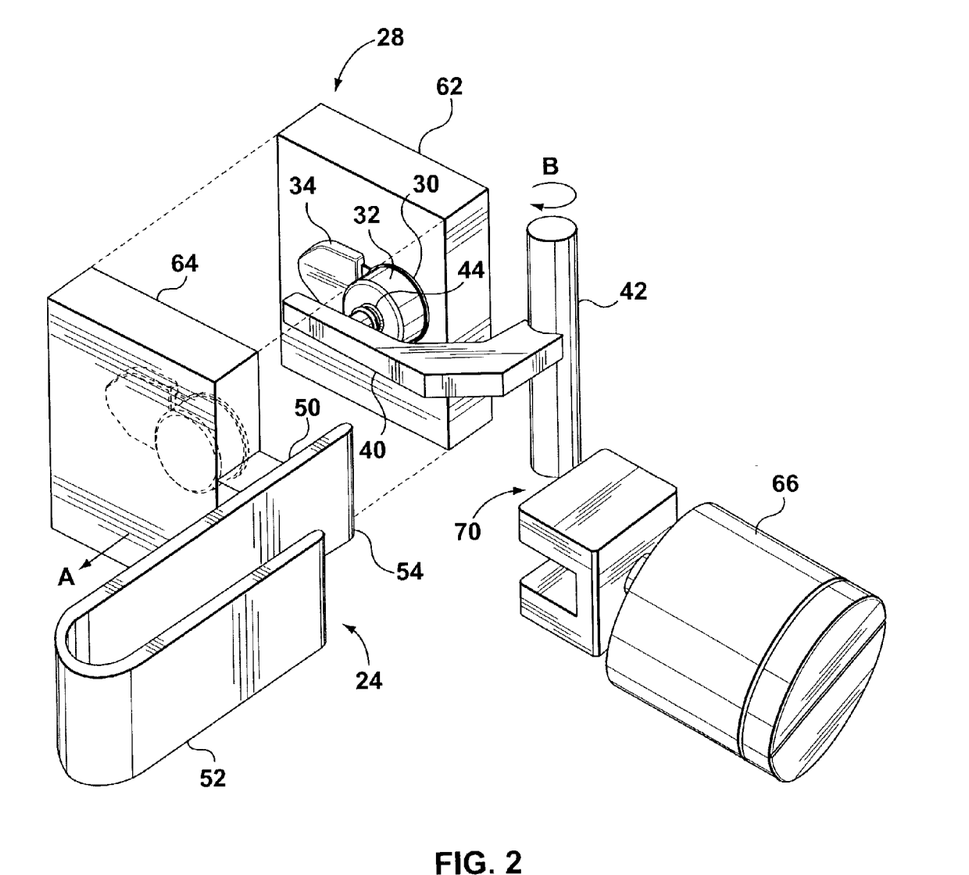
FIG. 2 is the view of FIG. 1 showing the mold open, and a swing arm rotated to engage the molded part.

Pusher member 68 has a channel 70 which receives arm 40 allowing plenty of clearance between pusher member 68 and arm 40. As shown in FIGS. 1 and 4, when arm 40 is in the first position there is a significant gap between the back wall 46 of arm 40 and the bottom 72 of channel 70. When actuator device 66 is actuated, pusher member 68 is moved towards arm 40. Legs 74 on either side of channel 70 engage the bottom of base portion 32 and push it towards second portion 52 thereby closing lid portion 34 against base portion 32. Lid portion 34 has a latching engagement with base portion 32 such that it stays closed once latched. The movement of base portion 32 by pusher member 68 may disengage base portion 32 from suction cup 44. Suction cup 44 preferably has an external source of suction, and may be resilient enough to stretch during the motion of base portion 32 such that it does not disengage base portion 32 when base portion 32 is moved by pusher member 68. The external suction source is disengaged from suction cup 44 at an appropriate time, such as when pusher member 68 has completed its motion.

The back wall 46 of arm 40 may act as a stop against which the bottom 72 of channel 70 engages thereby stopping the motion of pusher member 68. The gap between back wall 46 and bottom 72 can be set such that it allows sufficient motion of pusher member 68 to close and latch the lid portion 34, yet not so much motion that lid portion 34 or base portion 32 is crushed or deformed by motion of pusher member 68.

To release part 30, actuator device 66 is disengaged thereby retracting pusher member 68 to allow part 30 to drop free from second portion 52 of deflector 24. The operation of actuator portion 26 preferably occurs during plastic injection so that no additional cycle time is added to the molding process.

Figure 6:
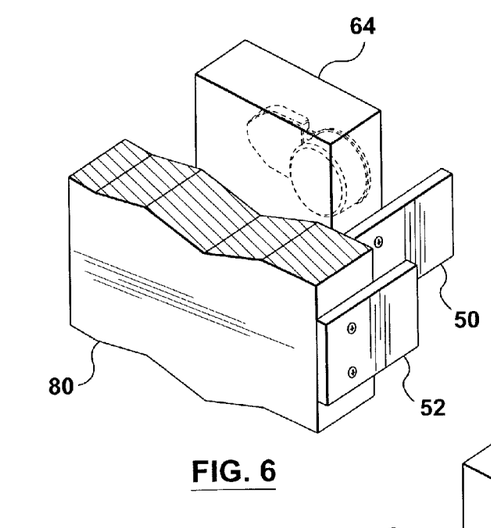
FIG. 6 is a perspective view of a portion of a mold plate and mold showing another embodiment of the deflector having two separate portions, one attached to the mold, and one attached to the mold plate.

First portion 50 and second portion 52 may be connected to each other by a connector portion 58 such as illustrated in FIGS. 1–5. In that case deflector 24 is bent or formed from a single piece of material and preferably attached to the cavity side 64 of mold 18 as illustrated. Referring to FIG. 6, alternatively, first portion 50 and second portion 52 may be two separate pieces of material with first portion 50 attached to cavity side 64, and second portion 52 attached to a cavity plate 80 to which cavity side 64 is attached. A cavity plate is typically larger than the cavity side of a mold, and is well-suited for attachment of the second portion 52 of the deflector 24. This embodiment is especially useful when the shaft 42 for swing arm mechanism 22 is located such that it passes between portions 50 and 52 as the mold opens and closes.

Figure 7:
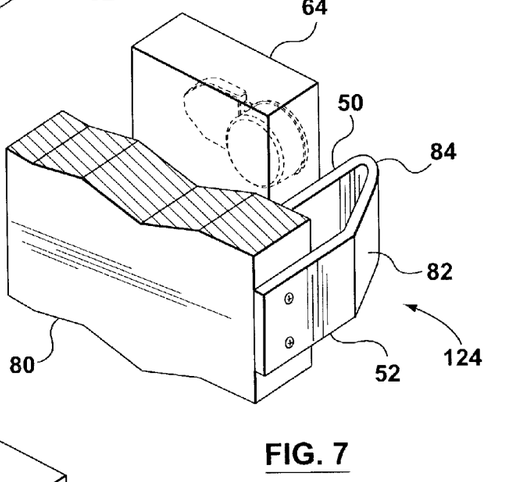
FIG. 7 is the view of FIG. 6 showing another embodiment of the deflector.
Figure 8:
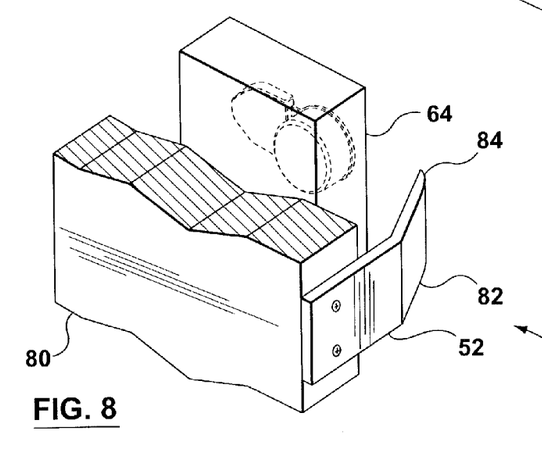
FIG. 8 is the view of FIG. 6 showing yet another embodiment of the deflector.

Referring to FIGS. 7 and 8, if the swing arm mechanism 22 is located sufficiently away from the mold so that there is no such interference problem, deflector 124 could be made of a single piece of material bent or formed as illustrated in FIG. 7. Portions 50 and 52 are connected by transition portion 82 with a nose 84 that is blunt. With this embodiment, nose 84 will contact lid portion 34 first, and as the mold closes, lid portion 34 will slide across transition portion 82 to second portion 52. Alternatively, first portion 50 could be eliminated, as shown in FIG. 5. In this embodiment second portion 52 of deflector to 24 is attached only to cavity plate 80. A transition portion 82 is bent inward from second portion 52 and terminates at nose 84 which is preferably bent or rounded. Since deflector 24 is cantilevered from cavity plate 80, it must be sufficiently stiff to not deflect unacceptably during operation.

Figure 9:
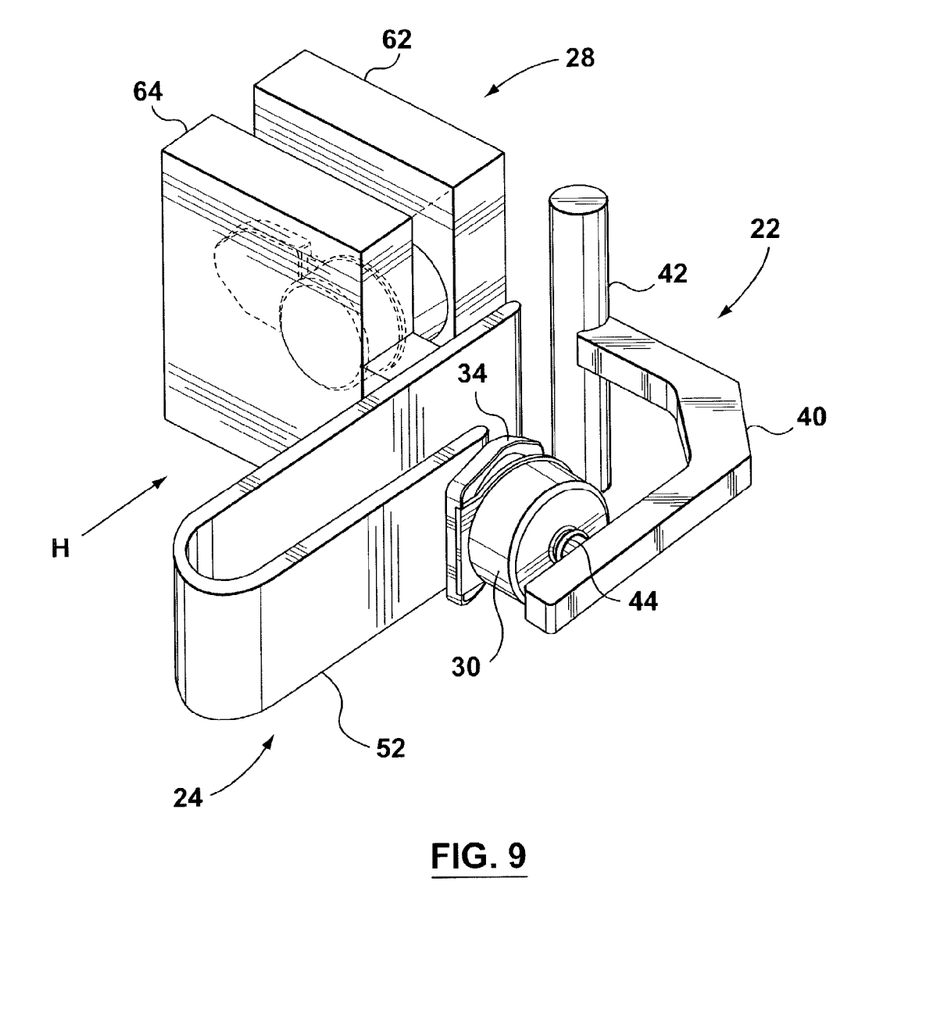
FIG. 9 is the view of FIG. 4 showing another embodiment of the invention without the closing actuator.
Figure 10:
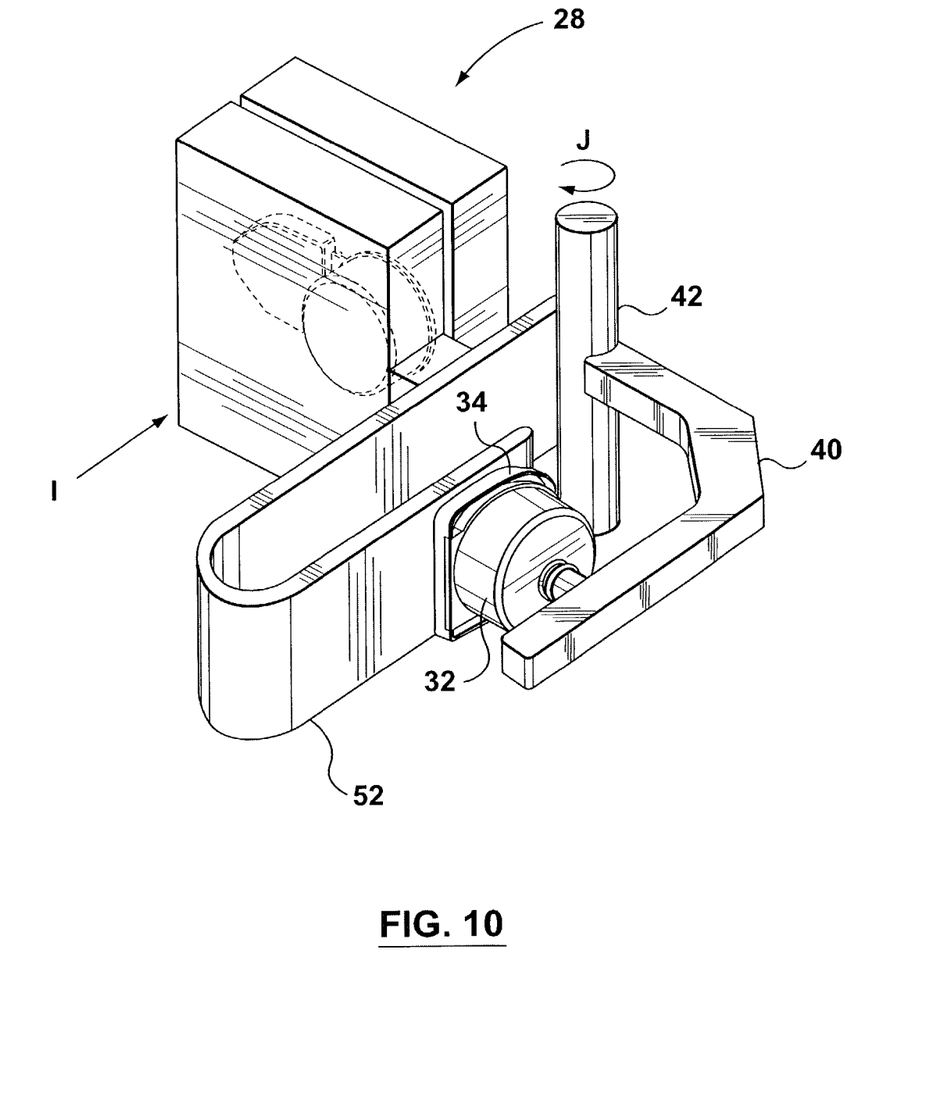
FIG. 10 is the view of FIG. 9 showing the mold closing further and the swing arm pivoting to close the lid.
Figure 11:
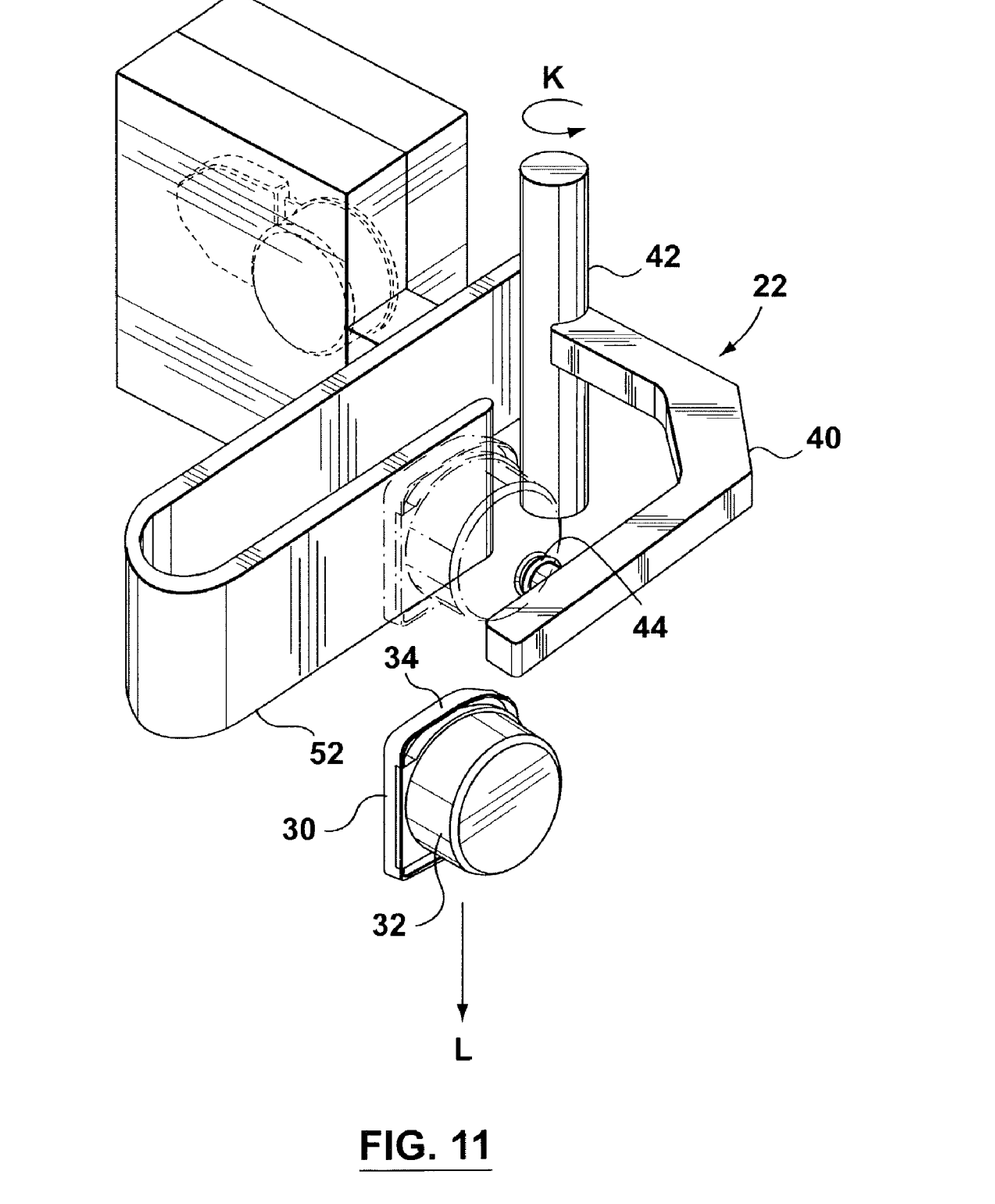
FIG. 11 is the view of FIG. 9 showing the mold closed, the swing arm pivoting back out, and the part with its closed lid released from the swing arm.

Referring to FIGS. 9–11, rather than having a separate closing actuator, the swing arm mechanism 22 can be used to close the lid portion of part 30. As shown in FIG. 9, as the mold 28 closes, as indicated by arrow H, second portion 52 of deflector 24 slides across lid 34 as in the previous embodiment. As shown in FIG. 70, as the mold continues to close, as indicated by arrow 1, second portion 52 has sufficient engagement of lid portion 34 that shaft 42 is then rotated, as indicated by arrow j, to pivot arm 40 inward, thereby pushing base portion 32 toward second portion 52 and latching lid portion 34 onto base portion 32. This operation may be performed as the mold 28 is still closing, and second portion 52 is still sliding across lid portion 34, or it may preferably be performed immediately after the mold 28 has closed so there is no motion of second portion 52 across lid portion 34. Referring to FIG. 11, after the lid portion 34 is latched onto base portion 32, shaft 42 is pivoted back, as indicated by arrow K, thereby moving arm 40 away from second portion 52. Vacuum to suction cup 44 is then released thereby allowing part 30 to drop away.

Figure 12:
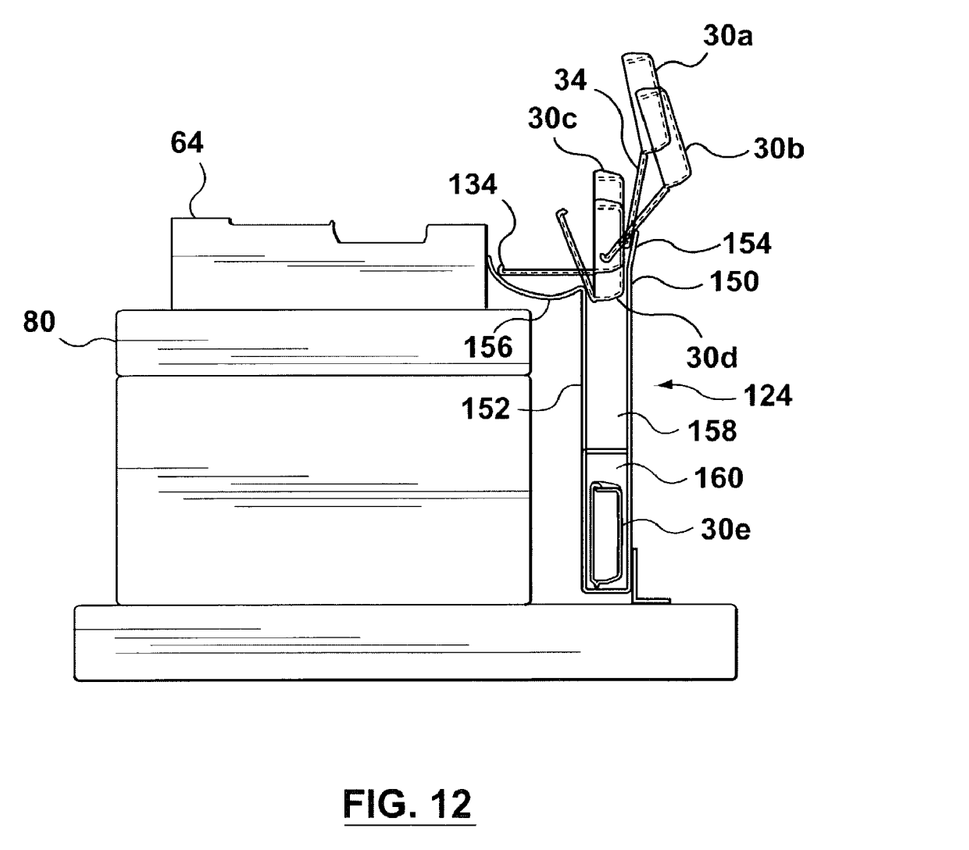
FIG. 12 is a top view of another embodiment of the present invention.

Referring to FIG. 12, another embodiment of the invention is illustrated. The motion of molded part 30 relative to deflector 124 is illustrated by sequential positions 30*a* through 30*e* of part 30. The swing arm positions and mold positions at those locations have been omitted for clarity. The deflector 124 is preferably a single piece formed so that a first portion 150 and a second portion 152 are substantially parallel to each other forming a slot 158 therebetween. Deflector 124 is connected to the cavity side 64 of the mold, and may be mounted in any appropriate manner, such as by being attached to the platen as illustrated. In this embodiment, first portion 150 is located outboard of, and extends beyond, second portion 152. Portion 150 has an end 154 that first contacts the lid portion 34 as swing arm 40 moves part 30 away from core side 62, as illustrated by the position of part 30*a*. Swing arm 40 continues to move part 30 outboard as the mold closes so that end portion 154 initiates folding of id portion 34, as illustrated by position of part 30*b*. Swing arm 40 then moves part 30 inboard so that lid portion 34 contacts end portion 156 of portion 152. End portion 156 is preferably curved to direct the end 134 of lid portion 34 along it to further fold the lid portion 34, as illustrated by position of part 30*c*. As swing arm 40 positions part 30 to move into the slot 158, the lid portion 34 is nearly fully closed by end 156, as illustrated by position of part 30*d*. Portion 150 has a slot (not shown) to accommodate passage of the swing arm 40 and/or suction cup 44 through it as the mold portions 62 and 64 close. As the part 30 is moved along slot 158, swing arm 40 pushes it inboard against portion 152 with sufficient force that the lid portion 34 latches against the base portion 32, as illustrated by position of part 30*e*. The part 30 is then released from suction cup 44 on swing arm 40 and can drop down a chute 160, which is partially defined by the deflector 124. This embodiment may require more precise and varied motion of the swing arm 40 in conjunction with the movement of the mold sides.

The present invention provides a simple efficient way of closing the hinged lid of a molded base or container as the part is removed from the mold without adding any time to the cycle time.

It will, of course, be understood that the above description has been given by way of example only and that modifications in detail may be made within the scope of the present invention. For example, the swing arm mechanism could be replaced with a conventional robot device that enters the open mold, grabs the part, moves it so the lid engages the deflector, and pushes the base to latch it to the lid. For another example, other parts that require folding but not latching could use the apparatus of the present invention without the closing actuator or the pushing step.

The invention claimed is:

1. An apparatus for folding a hinged molded part formed in a mold, the molded part having a base portion and a lid portion that engages the base portion when the part is folded at a hinge located between the base portion and the lid portion, the apparatus comprising:
   a part-removal apparatus proximate the mold and having a portion that, in use, grips one of the base portion or the lid portion of the molded part and moves the molded part out of the mold when the mold is open; and
   at least one deflector connected to the mold such that, in use, the defector engages the other of the base portion or the lid portion of the molded part as the molded part is moved out of the mold to initiate folding of the lid portion to the base portion at the hinge in advance of closure of the lid portion to the base portion, the deflector further folding the molded part as the mold closes.

2. The apparatus of claim 1, wherein the part-removal apparatus is a swing arm mechanism that includes an arm with a gripping device attached to a rotatable shaft located adjacent the mold, the shaft selectively rotatable to pivot the arm between a first position at which the swing arm mechanism is clear of the mold so the mold can open and close without interfering with the swing arm mechanism, and a second position at which the gripping device engages and grips the portion of the molded part.

3. The apparatus of claim 2, further comprising a closing actuator including a pusher member having a channel which receives the arm of the swing arm mechanism in clearance, the closing actuator selectively moving to engage the pusher member with the portion of the molded part gripped by the part-removal apparatus to push the potions of the part together so that they latch.

4. The apparatus of claim 3, wherein the channel has a bottom which, in use, abuts a back wall of the arm when the pusher member has moved sufficiently to latch the lid portion to the base portion of the part.

5. The apparatus of claim 1, further comprising a closing actuator having a portion that selectively moves to engage the portion of the molded part gripped by the part-removal apparatus to push the base portion and the lid portion together, thereby latching the lid portion and the base portion together.

6. An apparatus for folding a hinged molded part formed in a mold, the molded part having a base portion and a lid portion that engages the base portion when the part is folded at a hinge located between the base portion and the lid portion, the apparatus comprising:
- a part-removal apparatus proximate the mold and having a portion that, in use, grips one of the base portion or the lid portion of the molded part and moves the molded part out of the mold when the mold is open;
- at least one deflector connected to the mold such that, in use, the defector engages the other of the base portion or the lid portion of the molded part as the molded part is moved out of the mold to initiate folding of the lid portion to the base portion at the hinge in advance of closure of the lid portion to the base portion, the deflector further folding the molded part as the mold closes; and
- wherein the part-removal apparatus grips the base potion of the molded part, and the deflector has a first portion that contacts the lid portion first as the part is moved to initiate folding of the lid portion to the base portion at the hinge, and a second portion that contacts the lid portion after the first portion does, thereby continuing the folding as the mold closes.

7. The apparatus of claim 6, wherein the second portion is outboard of the first portion.

8. The apparatus of claim 7, wherein the first portion is attached to a cavity portion of the mold, and the second portion is attached to a plate supporting the cavity portion of mold.

9. The apparatus of claim 6, wherein the deflector is a single piece with a transition portion connecting the first portion and the second portion and a nose at a juncture between the transition portion and first portion.

10. The apparatus of claim 6, wherein the first portion and second portion are substantially parallel and form a slot into which the part is moved.

11. The apparatus of claim 10, wherein the first portion is outboard of the second portion.

12. The apparatus of claim 11, where in the second portion has a curved end which directs the lid portion along it as the part moves the into the slot to fold the lid portion.

13. The apparatus of claim 10, wherein the deflector partially defines a chute into which the part is released.

14. An apparatus for closing a hinged molded part in a molding machine, comprising:
- a part-removal apparatus, at least one deflector, and a closing actuator all constructed and arranged to operate in conjunction with a mold with moveable portions that form a molded part having a base portion and a lid portion that engages the base portion when the lid portion is folded at a hinge;
- the part-removal apparatus having a swing arm mechanism that includes an arm with a gripping device attached to a rotatable shaft located adjacent the mold, the shaft, in use, selectively rotatable to pivot the arm between a first position at which the swing arm mechanism is clear of the mold so that the mold can open and close without interfering with the swing arm mechanism, and a second position at which the gripping device engages and grips the base portion of the molded part when the mold is open;
- the at least one deflector being connected to the mold, the at least one deflector having a first portion that, in use, contacts the lid portion first as the part is moved to initiate folding of the lid portion to the base portion at the hinge, and a second portion that, in use, contacts the lid portion after the first portion does, thereby continuing the folding as the mold closes; and
- the closing actuator including a pusher member having a channel which receives the arm of the swing arm mechanism in clearance, the closing actuator selectively moving to engage the pusher member with the base portion of the part to push the base portion into the lid portion, thereby latching the lid portion and the base portion together.

* * * * *